(12) United States Patent
Brombach

(10) Patent No.: US 11,095,124 B2
(45) Date of Patent: Aug. 17, 2021

(54) METHOD FOR COMPENSATING FEED-IN CURRENTS IN A WIND PARK

(71) Applicant: Wobben Properties GmbH, Aurich (DE)

(72) Inventor: Johannes Brombach, Berlin (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 16/175,510

(22) Filed: Oct. 30, 2018

(65) Prior Publication Data
US 2019/0067943 A1    Feb. 28, 2019

Related U.S. Application Data

(63) Continuation-in-part of application No. PCT/EP2017/060794, filed on May 5, 2017.

(30) Foreign Application Priority Data

May 6, 2016    (DE) ...................... 10 2016 108 394.1

(51) Int. Cl.
*H02J 3/01* (2006.01)
*H02J 3/24* (2006.01)
(Continued)

(52) U.S. Cl.
CPC ................ *H02J 3/01* (2013.01); *F03D 7/048* (2013.01); *F03D 9/257* (2017.02); *H02J 3/24* (2013.01);
(Continued)

(58) Field of Classification Search
CPC ......... Y02E 40/40; Y02E 40/72; Y02E 40/74; H02J 3/01; H02J 3/24; F03D 7/0284;
(Continued)

(56) References Cited

U.S. PATENT DOCUMENTS

| | | | | |
|---|---|---|---|---|
| 4,633,400 A | * | 12/1986 | Chittineni | G01V 1/366 382/210 |
| 5,092,343 A | * | 3/1992 | Spitzer | A61B 5/0488 600/515 |

(Continued)

FOREIGN PATENT DOCUMENTS

| | | |
|---|---|---|
| CN | 105098834 A | 11/2015 |
| DE | 102014216210 A1 | 2/2016 |

(Continued)

OTHER PUBLICATIONS

Todeschini et al., "Wind energy conversion systems as active filters: design and comparison of three control methods", IET Renewable Power Generation, vol. 4, Iss. 4, pp. 341-353, (2010).

(Continued)

*Primary Examiner* — Darrin D Dunn
(74) *Attorney, Agent, or Firm* — Seed IP Law Group LLP

(57) ABSTRACT

A wind farm for feeding a total electric current into an electrical supply network at a network connection point is provided. The wind farm has at least one wind power installation designed as a compensation wind power installation and an active compensation unit to generate a compensating component current having a modulated compensation proportion. At least one wind power installation without compensation is configured to generate a non-compensating component current without a modulated compensation proportion. The compensating component current and the non-compensating component current are superposed to form the total electric current to be fed in in a farm network that connects the wind power installations. The compensating component current is generated so that the total current to be fed in influences an occurring reference current or an occurring reference voltage to achieve a (Continued)

prescribed current form for the reference current or a prescribed voltage form for the reference voltage.

16 Claims, 8 Drawing Sheets

(51) Int. Cl.
*F03D 9/25* (2016.01)
*H02J 3/38* (2006.01)
*H02J 3/46* (2006.01)
*F03D 7/04* (2006.01)

(52) U.S. Cl.
CPC ............. *H02J 3/386* (2013.01); *H02J 3/46* (2013.01); *F05B 2270/337* (2013.01); *Y02E 10/76* (2013.01)

(58) Field of Classification Search
CPC ........... H02M 1/12; H02M 2001/0009; H02M 1/126; H02M 1/42; H02M 1/44; G05B 15/02

See application file for complete search history.

(56) References Cited

U.S. PATENT DOCUMENTS

| | | | | |
|---|---|---|---|---|
| 5,345,375 A * | 9/1994 | Mohan | H02J 3/01 | 307/105 |
| 5,499,178 A * | 3/1996 | Mohan | H02J 3/01 | 307/105 |
| 6,282,104 B1 * | 8/2001 | Kern | H02M 1/12 | 363/34 |
| 6,326,796 B1 * | 12/2001 | Koda | G01R 19/2513 | 324/623 |
| 7,462,946 B2 * | 12/2008 | Wobben | F03D 7/0284 | 290/44 |
| 7,944,068 B2 * | 5/2011 | Wagoner | H02J 3/38 | 290/44 |
| 8,198,753 B2 * | 6/2012 | Algrain | H02J 3/005 | 307/84 |
| 8,319,374 B2 * | 11/2012 | Wang | H02J 3/01 | 307/82 |
| 8,405,251 B2 * | 3/2013 | Barton | H02J 3/386 | 290/44 |
| 8,618,694 B2 * | 12/2013 | Santos | F03D 7/0284 | 307/102 |
| 8,971,066 B2 | 3/2015 | Oi et al. | | |
| 9,184,652 B2 * | 11/2015 | Acker | H02M 7/04 | |
| 9,263,936 B2 * | 2/2016 | Jones | H02J 3/383 | |
| 9,279,411 B2 | 3/2016 | Beekmann et al. | | |
| 9,444,322 B2 * | 9/2016 | Park | H02M 1/12 | |
| 9,444,323 B2 * | 9/2016 | Proca | H02M 7/48 | |
| 9,690,313 B2 * | 6/2017 | Matan | H02M 7/48 | |
| 9,728,961 B2 * | 8/2017 | Hehenberger | H02J 3/01 | |
| 10,003,198 B2 | 6/2018 | Pan et al. | | |
| 10,075,016 B2 * | 9/2018 | Wilkins | H02J 3/01 | |
| 10,110,010 B2 * | 10/2018 | Lucas | H02J 3/381 | |
| 2003/0227172 A1 * | 12/2003 | Erdman | F03D 7/0284 | 290/44 |
| 2010/0109328 A1 * | 5/2010 | Li | H02M 7/53875 | 290/44 |
| 2010/0280672 A1 * | 11/2010 | Llorente Gonzalez | H02J 3/38 | 700/287 |
| 2011/0118892 A1 * | 5/2011 | Mayor | F03D 7/0284 | 700/295 |
| 2011/0133563 A1 * | 6/2011 | Barton | H02J 3/386 | 307/84 |
| 2011/0175353 A1 * | 7/2011 | Egedal | F03D 7/028 | 290/44 |
| 2011/0260547 A1 * | 10/2011 | Wang | H02J 3/01 | 307/82 |
| 2011/0309683 A1 * | 12/2011 | Nielsen | H02J 3/16 | 307/84 |
| 2012/0004781 A1 * | 1/2012 | Santos | F03D 7/0284 | 700/287 |
| 2012/0019007 A1 * | 1/2012 | Nelson | H02J 3/01 | 290/1 R |
| 2012/0032443 A1 * | 2/2012 | Hehenberger | H02J 3/1885 | 290/44 |
| 2012/0081824 A1 * | 4/2012 | Narendra | H02H 3/46 | 361/86 |
| 2012/0101643 A1 * | 4/2012 | Kirchner | F03D 9/257 | 700/287 |
| 2012/0112714 A1 * | 5/2012 | Agudo Araque | H02J 3/1842 | 323/210 |
| 2012/0139241 A1 * | 6/2012 | Haj-Maharsi | F03D 7/0224 | 290/44 |
| 2012/0155125 A1 * | 6/2012 | Zhang | H02M 1/44 | 363/34 |
| 2012/0181879 A1 * | 7/2012 | Andresen | H02J 3/02 | 307/151 |
| 2012/0193991 A1 | 8/2012 | Jensen et al. | | |
| 2012/0203385 A1 * | 8/2012 | Kumar | H02J 3/26 | 700/287 |
| 2012/0206945 A1 * | 8/2012 | Brogan | H02M 1/12 | 363/40 |
| 2013/0038123 A1 * | 2/2013 | Wilkins | H02J 3/01 | 307/18 |
| 2013/0070489 A1 * | 3/2013 | Zhang | H02M 5/45 | 363/36 |
| 2013/0135907 A1 * | 5/2013 | Oi | H02J 3/01 | 363/40 |
| 2013/0173078 A1 * | 7/2013 | Divan | G05F 5/00 | 700/295 |
| 2013/0193766 A1 * | 8/2013 | Irwin | H02H 7/268 | 307/82 |
| 2013/0314057 A1 * | 11/2013 | Jernstrom | H02J 3/26 | 323/217 |
| 2014/0001991 A1 * | 1/2014 | Nishibata | H02P 6/10 | 318/400.23 |
| 2014/0063873 A1 * | 3/2014 | Acker | H02M 7/04 | 363/40 |
| 2014/0103652 A1 * | 4/2014 | Ubben | F03D 7/028 | 290/44 |
| 2014/0152292 A1 * | 6/2014 | Andresen | G01R 31/40 | 324/76.11 |
| 2014/0152331 A1 * | 6/2014 | Wagoner | G01R 27/16 | 324/705 |
| 2014/0192567 A1 * | 7/2014 | Balocco | H02M 7/48 | 363/40 |
| 2015/0035467 A1 * | 2/2015 | MacLennan | H02M 1/12 | 318/503 |
| 2015/0061289 A1 * | 3/2015 | Larsen | F03D 7/00 | 290/44 |
| 2015/0148974 A1 * | 5/2015 | Diedrichs | H02J 3/16 | 700/287 |
| 2015/0226185 A1 * | 8/2015 | Beekmann | H02J 3/386 | 290/44 |
| 2015/0240784 A1 * | 8/2015 | Sagi | F03D 7/048 | 700/287 |
| 2015/0267683 A1 * | 9/2015 | Ubben | F03D 7/00 | 290/44 |
| 2016/0087436 A1 * | 3/2016 | Matan | H02J 3/382 | 700/295 |
| 2016/0087522 A1 * | 3/2016 | Matan | H02J 3/382 | 323/207 |
| 2016/0131109 A1 * | 5/2016 | Busker | F03D 7/048 | 290/44 |
| 2016/0134114 A1 * | 5/2016 | Gupta | H02M 7/44 | 307/82 |
| 2016/0197482 A1 * | 7/2016 | Varma | H02J 3/01 | 307/64 |
| 2016/0248254 A1 * | 8/2016 | Huomo | H02J 13/0006 | |
| 2017/0009740 A1 * | 1/2017 | Geisler | H02J 3/386 | |
| 2017/0067445 A1 * | 3/2017 | Carulla | F03D 7/0284 | |
| 2017/0279324 A1 | 9/2017 | Röer | | |

(56) References Cited

U.S. PATENT DOCUMENTS

2018/0069499 A1\* 3/2018 Engelken ............... H02P 6/10
2018/0323619 A1\* 11/2018 Ganireddy ............ H02J 3/386

FOREIGN PATENT DOCUMENTS

| EP | 2482418 A1 | 8/2012 |
|---|---|---|
| JP | 2016063742 A | 4/2016 |
| RU | 2011142739 A | 4/2013 |
| WO | 0173518 A1 | 10/2001 |
| WO | 2014131454 A1 | 9/2014 |

OTHER PUBLICATIONS

Dong Energy, "Harmonic Challenges and Mitigation in Large Offshore Wind Power Plants," *Harmony Symposium*, Aalborg University, Aalborg Denmark, Aug. 26, 2015, 15 pages.

Freijedo et al., "Harmonic Resonances in Wind Power Plants: Modeling, Analysis and Active Mitigation Methods," *IEEE Eindhoven PowerTech*, Eindhoven, Netherlands, Jun. 29-Jul. 2, 2015, 6 pages.

Todeschini et al., "Transient Response of a Wind Energy Conversion System Used as Active Filter," *IEEE Transactions on Energy Conversion* 26(2):522-531, Jun. 2011.

\* cited by examiner

METHOD FOR COMPENSATING FEED-IN CURRENTS IN A WIND PARK

BACKGROUND

Technical Field

The present invention relates to a wind farm for feeding a total electric current into a supply network at a network connection point. The present invention further relates to a compensation wind power installation and to a method for feeding in a total electric current by means of a wind farm and to a method for generating a current of a compensation wind power installation.

Description of the Related Art

It is known, particularly for wind farms, to generate alternating electric current for feeding into an electrical supply network by virtue of the fact that a plurality of wind power installations each having at least one inverter each generate a component current, which is superposed to form a total electric current to be fed in and is fed into the electrical supply network. Such wind power installations are also referred to as converter-coupled generators.

The component currents of the converter-coupled generators are mostly generated by means of modulation methods using a multiplicity of inverters, in particular of cascaded inverters.

A disadvantage of the use of such modulation methods is, in particular, that the individual component currents can have high harmonics levels. This effect can also be negatively amplified by the cascaded embodiment of the inverters, in particular so that the total electric current to be fed in by the wind farm no longer meets the requirements of the electrical supply network.

Harmonics are to be understood below as meaning essentially harmonics of a current; these can be determined by a series of known analysis methods.

The German Patent and Trademark Office has searched the following prior art in the priority application relating to the present application: WO 01/73518 A1; U.S. Pat. No. 8,971,066 B2; "Harmonic Resonances in Wind Power Plants: Modeling, Analysis and Active Mitigation Methods" by F. D. Freijedo et al., IEEE Eindhoven PowerTech, 2015; "Harmonic Challenges and Mitigation in Large Offshore Wind Power Plants" by Dong Energy Wind Power, Harmony Symposium, Aug. 26, 2015; "Transient Response of a Wind Energy Conversion System Used as Active Filter" by Grazia Todeschini et al., IEEE Transactions on Energy Conversion, Volume 26, No. 2, June 2011.

BRIEF SUMMARY

Control and/or compensation of the harmonic content of the total current to be fed in from a wind farm is described herein.

According to the invention, a wind farm for feeding a total electric current into an electrical supply network at a network connection point is proposed. The wind farm comprises at least one wind power installation, which has an active compensation unit, and at least one further wind power installation, which is designed as a wind power installation without compensation.

The at least one wind power installation having the active compensation unit is subsequently also referred to as a compensation wind power installation and is designed to generate a compensating component current having a modulated compensation proportion, that is to say a component current onto which a compensation proportion has been modulated by the active compensation unit. For this purpose, an active filter can be used, for example, which modulates a compensation proportion onto the current generated by the wind power installation. The compensation wind power installation thus generates in a first step a conventional current, onto which a compensation proportion, which has been generated by an active compensation unit, is modulated in a second step.

The at least one further wind power installation, which is subsequently also referred to as a wind power installation without compensation, does not have an active compensation unit in the sense of a compensation wind power installation and is designed to generate a non-compensating component current without a modulated compensation proportion, that is to say in a conventional manner. Such a non-compensating component current can be generated, for example, by a frequency inverter. The frequency inverter can implement pulse-width modulation or a tolerance range method, for example, but does not carry out additional modulation for the non-compensating component current in the sense that harmonics proportions or compensation proportions are supplemented in a targeted manner to form the current generated in this way. In any case, no modulation is performed by an active compensation unit.

Furthermore, the wind power installations of the wind farm, that is to say both the compensation wind power installations and the wind power installations without compensation, are connected to one another by means of a common farm network and feed into a supply network by means of a common network connection point as a wind farm. The compensating and non-compensating component currents generated by the wind power installations are thus superposed in the farm network to form a common total electric current to be fed in.

The compensation wind power installation is configured to generate the compensating component current having a modulated component proportion so that, when the compensating and the non-compensating component currents, that is to say all of the component currents, are superposed, a total current to be fed in is generated, which total current forms at a reference point the reference current occurring there so that that the reference current achieves a prescribed current form or a prescribed current. Depending on the case of use, it is proposed that, instead of a reference current, a reference voltage is considered and the total current to be fed in is generated so that said reference voltage achieves a prescribed voltage form or a prescribed voltage. This is also achieved by superposing the compensating and the non-compensating component currents to form the total current to be fed in. The consideration of a reference voltage instead of a reference current is proposed particularly for a reference point that is arranged in the electrical supply network. In this case, it comes down less to the current form than to the voltage form, whereas in the case of considering the reference point in the farm network, or in a section between the farm network and the network connection point, the consideration of a reference current is preferred.

Subsequent explanations regarding embodiments and effects in connection with a reference current also apply analogously to reference voltages.

In this case, the fact that a wind power installation of an already existing wind farm can be retrofitted with an active filter in order to thus increase the quality of the current of the entire wind farm to be fed in is particularly advantageous.

To this end, the reference point can be located in the farm network itself, between the farm network and the network connection point or in the supply network.

The wind farm preferably has a detection device or means for detecting harmonics of the reference current, which harmonics occur at the reference point, and the active compensation unit is configured to generate the modulated compensation proportion depending on the detected harmonics of the reference current, which harmonics occur at the reference point, so that the harmonics of the reference current or of the reference voltage, which harmonics occur at the reference point, are compensated or at least reduced or minimized.

The detection means is configured, in particular, to detect the harmonics occurring at the reference point and to transmit said harmonics to the active compensation unit. This can be carried out both directly and indirectly and/or by means of cable or radio or the like. The detection means can furthermore be designed both as a measurement device or means or as a measurement receiver.

The active compensation unit generates the modulated compensation proportion preferably depending on the detected harmonics so that the harmonics at the reference point are compensated or at least reduced or minimized. For example, the network connection point can be selected as the reference point so that the compensation wind power installation minimizes or, in the best case, completely eliminates the harmonics of the total current to be fed in at the network connection point. The wind farm then feeds into the supply network substantially without harmonics. It is particularly advantageous here that a wind power installation or a few wind power installations having an active compensation unit can virtually eliminate all of the harmonics of a wind farm.

The wind farm preferably has exactly one compensation wind power installation or the wind farm has at least one subnetwork, which comprises exactly one compensation wind power installation.

The number of compensation wind power installations is therefore adapted according to the wind farm power. In particular, to compensate harmonics, according to one of the above embodiments, a compensation wind power installation is configured to compensate the harmonics of a multiplicity of wind power installations without compensation, for example in a ratio of greater than 1:5, in particular greater than 1:10. If the wind farm has more than 10 wind power installations, it is proposed to subdivide them into subnetworks so that the wind farm preferably has exactly one compensation wind power installation for each subnetwork. In particular, in the compensation of harmonics, particularly a few compensation wind power installations are required.

According to the invention, a wind power installation for generating electrical power for feeding into an electrical supply system is furthermore proposed. This is referred to above and subsequently as a compensation wind power installation. The compensation wind power installation has an active compensation unit, in particular an active filter, in order to generate a compensating component current having a modulated compensation proportion, wherein the compensation proportion is modulated by the active compensation unit in order to reach or to generate a setpoint current form of a reference current at a reference point. The wind power installation is therefore configured to function as a compensation installation of a wind farm described above and below in accordance with at least one embodiment.

The compensation wind power installation is further designed as a conventional wind power installation, for example as a wind power installation without a transmission, having a synchronous generator and a full converter, which wind power installation generates a conventional component current. In addition, the compensation wind power installation has an active compensation unit, which modulates a compensation proportion onto said conventional component current. The modulation is therefore carried out by the active compensation unit. The conventional component current is in this case modulated in accordance with one embodiment accordingly using a compensation proportion so that a reference current at a reference point reaches a specific setpoint current form.

A detection means is preferably provided for detecting harmonics of the reference current, which harmonics occur at the reference point, and the active compensation unit is configured to modulate the compensation proportion depending on the detected harmonics of the reference current or of the reference voltage, which harmonics occur at the reference point, so that the harmonics of the reference current or of the reference voltage, which harmonics occur at the reference point, are compensated or at least reduced or minimized.

The active compensation unit of the compensation wind power installation is therefore configured to detect harmonics at a reference point by means of a detection means. The detection means can in this case also be a constituent part of the active compensation unit or of the compensation wind power installation.

In addition, the active compensation unit is preferably configured to modulate the harmonics of the compensation wind power installation by means of a compensation proportion so that the harmonics of a reference current, which harmonics occur at a reference point, are compensated or minimized.

The active compensation unit is preferably arranged at a low-voltage side of the wind power installation.

The active compensation unit of the compensation wind power installation is, for example, arranged as an active filter at the low-voltage side of the wind power installation. The low-voltage side is usually located at the primary side of the wind power installation, which has a rated voltage of below 1 kilovolts (kV). The wind power installation is then accordingly connected via a transformer to the supply network or to the farm network, which has, for example, a rated voltage of 10 kV or 20 kV. The wind power installation is therefore connected to the farm network via a transformer and the active compensation unit is arranged at the primary side of the transformer.

According to the invention, a method for feeding a total electric current into an electrical supply network at a network connection point by means of a wind farm is furthermore proposed. The method comprises detecting a reference current that is dependent on the total current at a reference point, generating at least one first component current of the total current by means of a first wind power installation, where the first wind power installation is designed as a compensation wind power installation and has an active compensation unit, modulating a compensation proportion onto the at least one first component current by means of the active compensation unit of the first wind power installation in order to compensate or to reduce harmonics of the reference current or of the reference voltage, generating at least one second component current of the total current by means of a second wind power installation without compensation, where the second generated component current is not modulated by means of a compensation proportion of an active compensation unit and a non-compensating component current without a modulated compensation proportion is consequently generated, and superposing the at least one first compensating component current with the at least one second non-compensating component current at a superposition point to form the total electric current to be fed in at the network connection point.

In a first step, the harmonics of a reference current are therefore detected at a reference point; this can be performed, for example, using conventional measurement means. If the network connection point is selected as the reference point, the reference current thus corresponds to the total current to be fed in. If the reference point is outside of the wind farm, the reference current is thus only partly dependent on the total current to be fed in. The reference current thus then comprises a multiplicity of infed currents of different generators and at least one component of the total current to be fed in.

In a second step, a component current is then generated by means of the compensation wind power installation and then modulated by the active compensation unit so that the harmonics detected or occurring at the reference point are compensated accordingly. To this end, a compensation proportion is modulated onto the component current by means of the active compensation unit. In this case, it is taken into account that the current at the reference point is composed of said component current having a compensation proportion and of further component currents that are not modulated for compensation. In this case, the compensation is performed particularly depending on a previously calculated setpoint value and/or so that the occurring harmonics are minimized, in particular are eliminated.

The proposed method therefore makes it possible to compensate harmonics easily by means of a few compensation wind power installations, that is to say conventional wind power installations, which have been provided and/or retrofitted with an active filter. Optimally, only one wind power installation of a wind farm needs to be provided with a compensation unit.

In a preferred embodiment, the method according to the invention is designed as a control method with feedback and/or is optimized by means of wind farm network analysis.

A harmonics setpoint value is preferably prescribed for compensation or reduction of the harmonics and the at least one first compensating component current having a modulated compensation proportion is generated depending on the harmonics setpoint value, in particular so that the harmonics setpoint value forms a reference variable for the generation in order to prescribe the harmonics of the at least one compensating component current or in order to prescribe the total harmonics of the superposed total current, particularly for a location other than the reference point.

By prescribing harmonics setpoint values, it is possible to modulate the superposed total current almost as desired. As a result of this, it is possible to generate both a total current that is virtually free of harmonics and a total current that still has only specific harmonics, which total currents attenuate harmonics present in the supply network, for example. For this purpose, a control is preferably used, in which the harmonics setpoint values are used as reference variable of the control in order to generate a desired reference current at the reference point.

A state observer is preferably used to detect the harmonics at the reference point, where the state observer detects the harmonics at the reference point minus the compensation achieved by the at least one first compensating component current as non-compensated harmonics and the non-compensated harmonics are taken into account to generate the at least one first compensating component current having a modulated compensation proportion.

This can achieve a situation in which the harmonics to be compensated are also detected well when the compensation is effective, that is to say when, in the ideal case, harmonics no longer occur at the reference point due to the compensation. In this case, however, the compensation should nevertheless be continued even though no harmonics can be identified at the reference point. For this, the compensation then observes the uncompensated harmonics, that is to say the harmonics at the reference point minus the compensation achieved by the at least one first modulated compensation proportion. Said uncompensated harmonics are preferably detected by a state observer. A controller, which is designed as an observer or estimator, is therefore used for the control.

The reference point is preferably the network connection point.

As a result of this, it is possible for a wind farm that uses the method according to the invention to generate a total current to be fed in, which does not have harmonics or has only low harmonics. This is particularly desirable for wind farms that are connected to a weak network.

The reference point is preferably located outside of the wind farm, wherein the proposed method furthermore comprises identifying harmonics setpoint values depending on harmonics detected at the reference point, controlling the active compensation unit depending on the identified harmonics setpoint values in order to generate harmonics in accordance with the harmonics setpoint values and to generate the at least one first component current having a modulated compensation proportion so that the total current to be fed in has corresponding harmonics.

For example, a node in the supply network is selected as the reference point. This is particularly desirable when the method is carried out by a wind farm, which is the greatest infeeder or the network generator with respect to the reference point. If harmonics now occur at the reference point, these can be converted and passed to the compensation wind power installations as setpoint values. The wind farm that has the compensation wind power installations then generates specific harmonics at the network connection point of the wind farm. The total current generated in this way is then fed into the supply network and superposed there in such a way that the harmonics, namely particularly the voltage harmonics, are compensated at the reference point and the supply network is therefore stabilized.

Preferably, a check is carried out to determine whether harmonics at the reference point exceed limit values, in particular for the 5th, 7th, 11th, 13th, 17th and/or 19th harmonic, and in that the at least one modulated compensation proportion is optionally modulated onto the first component current only when harmonics at the reference point have exceeded at least one limit value.

According to this embodiment, a harmonic is assumed or the method is carried out therefore only when a specific limit value has been exceeded. Only when the limit values have been exceeded is the compensation then activated and a compensation proportion modulated. The active compensation unit is therefore occasionally inactive. Such a procedure is particularly well suited to preventing oscillations in the compensation wind power installation, the wind farm and/or the supply network.

In a particularly preferred embodiment, a check is carried out to determine whether the 5th, 7th, 11th, 13th, 17th and/or 19th harmonic exceed a limit value. In order to improve the quality at the reference point, one or more checking criteria are thus selected in a targeted manner. The 5th, 7th, 11th, 13th, 17th and/or 19th harmonic are particularly well suited here since these are often generated by inverters of a higher order and the number of these inverters increases steadily with the increase in decentralized generators and will continue to increase. The method is consequently particularly well suited to inverter-dominated supply networks.

The check for harmonics at the reference point preferably comprises a divergence analysis and, when a divergence is determined, the specific setpoint values are retained as long as the divergence continues. That is to say a check is carried out to determine whether values diverge and indicate oscillation.

It is proposed that, in the event of oscillation of the network, in particular of the harmonics, setpoint values are no longer transmitted to the active compensation units and the modulation by the active filters is adjusted. The method for compensating harmonics is therefore stopped when the supply network is at risk of becoming unstable. It is therefore possible to use the method also in small decentralized supply networks, which have a tendency to oscillate.

The total electric current is preferably generated by means of a wind farm according to at least one embodiment described above and/or at least one modulated component current is generated by means of a wind power installation according to at least one wind power installation embodiment described above.

According to the invention, a method for generating at least one compensation proportion by means of an active compensation unit of a wind power installation according to the invention, in particular according to at least one wind power installation embodiment described above, is also proposed, wherein the component current modulated by means of the active compensation unit is provided at a low-voltage side of the wind power installation.

BRIEF DESCRIPTION OF THE SEVERAL VIEWS OF THE DRAWINGS

The present invention is now explained by way of example in more detail below on the basis of exemplary embodiments with reference to the accompanying figures.

DETAILED DESCRIPTION

Figure 1A:
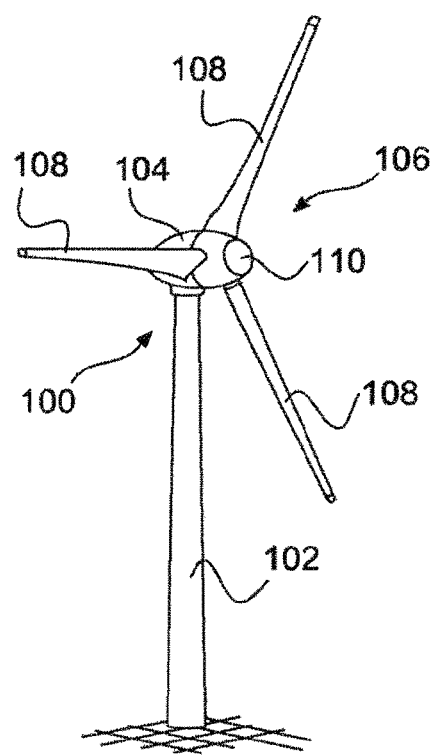
FIG. 1A shows a schematic view of a wind power installation.

FIG. 1A shows a wind power installation 100 for generating electrical power for feeding into an electrical supply network and/or into a farm network of a wind farm comprising the wind power installation 100. The wind power installation 100 has a tower 102 and a nacelle 104. On the nacelle 104 there is arranged an aerodynamic rotor 106 with three rotor blades 108 and a spinner 110. During operation, the rotor 106 is set in rotation by the wind and thereby drives a generator in the nacelle 104.

Figure 1B:
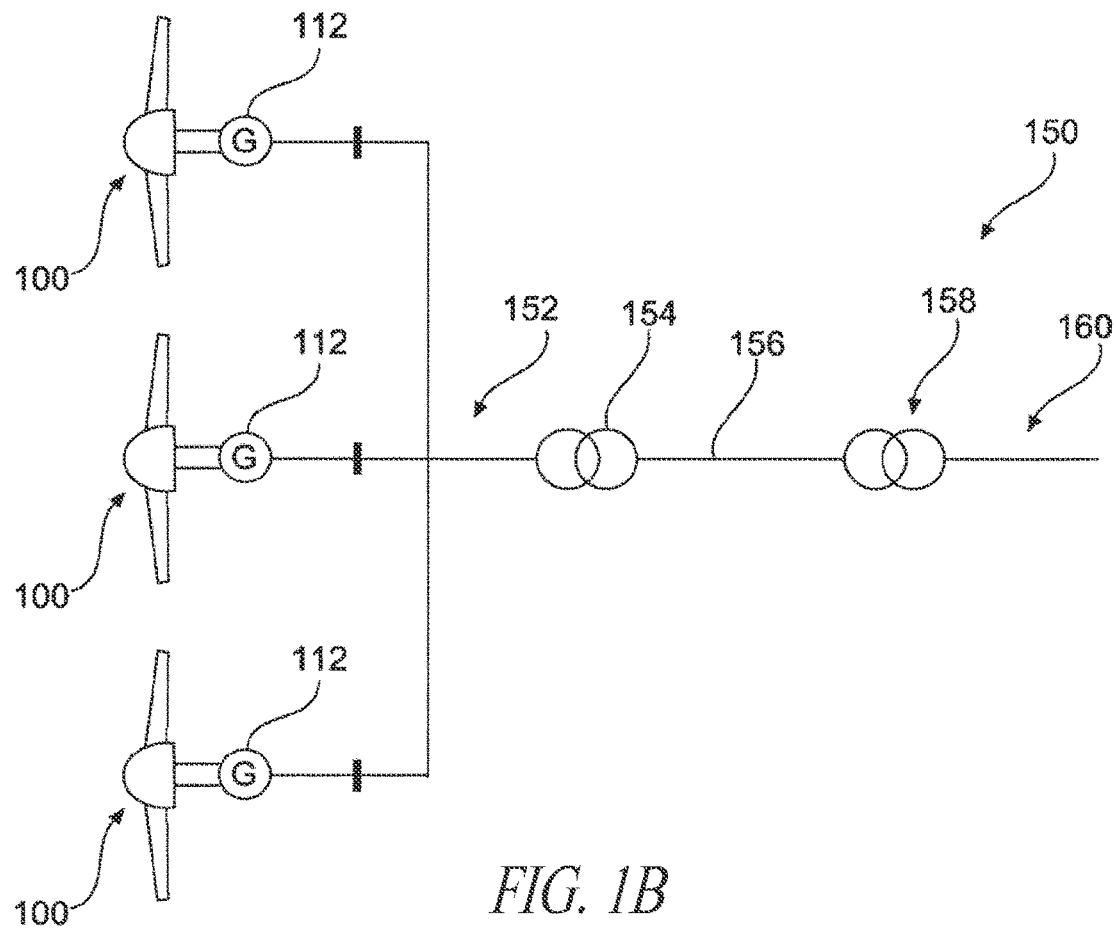
FIG. 1B schematically shows a conventional wind farm.

FIG. 1B shows a conventional wind farm 150 having, by way of example, three wind power installations 100 for generating electrical power by means of a generator 112, wherein the wind power installations 100 may be identical or different. The three wind power installations 100 are thus representative of any desired number of wind power installations 100 of a wind farm 150. The wind power installations 100 provide their power, namely, in particular, the generated current, to a farm network 152 as a component current in each case. In this case, the respectively generated component currents or powers of the individual wind power installation 100 in the farm network 152 are added and provided at a transformer 154, which is also referred to as a farm transformer 154. The farm transformer 154 is configured and provided to step up the voltage of the farm network 152 and thus provide the electrical power to a supply network, in particular via a connecting line 156, which connects the wind farm 150 at a network connection point 158 to an electrical supply network 160. The network connection point 158 is also generally referred to as infeed point or point of common coupling (PCC) and is the point at which the wind farm 150 is connected to the electrical supply network and feeds in its electrical power. The network connection point 158 can optionally have a further transformer. FIG. 1B is only a simplified illustration of a conventional wind farm 150, which does not show, for example, a control system, although a control system is present, of course. The farm network 152 can also, for example, be designed differently by virtue of a transformer also being present at the output of each wind power installation 100 or a plurality of wind power installations 100 forming a subnetwork, for example, the multiplicity of which forms the farm network 152.

Figure 2:
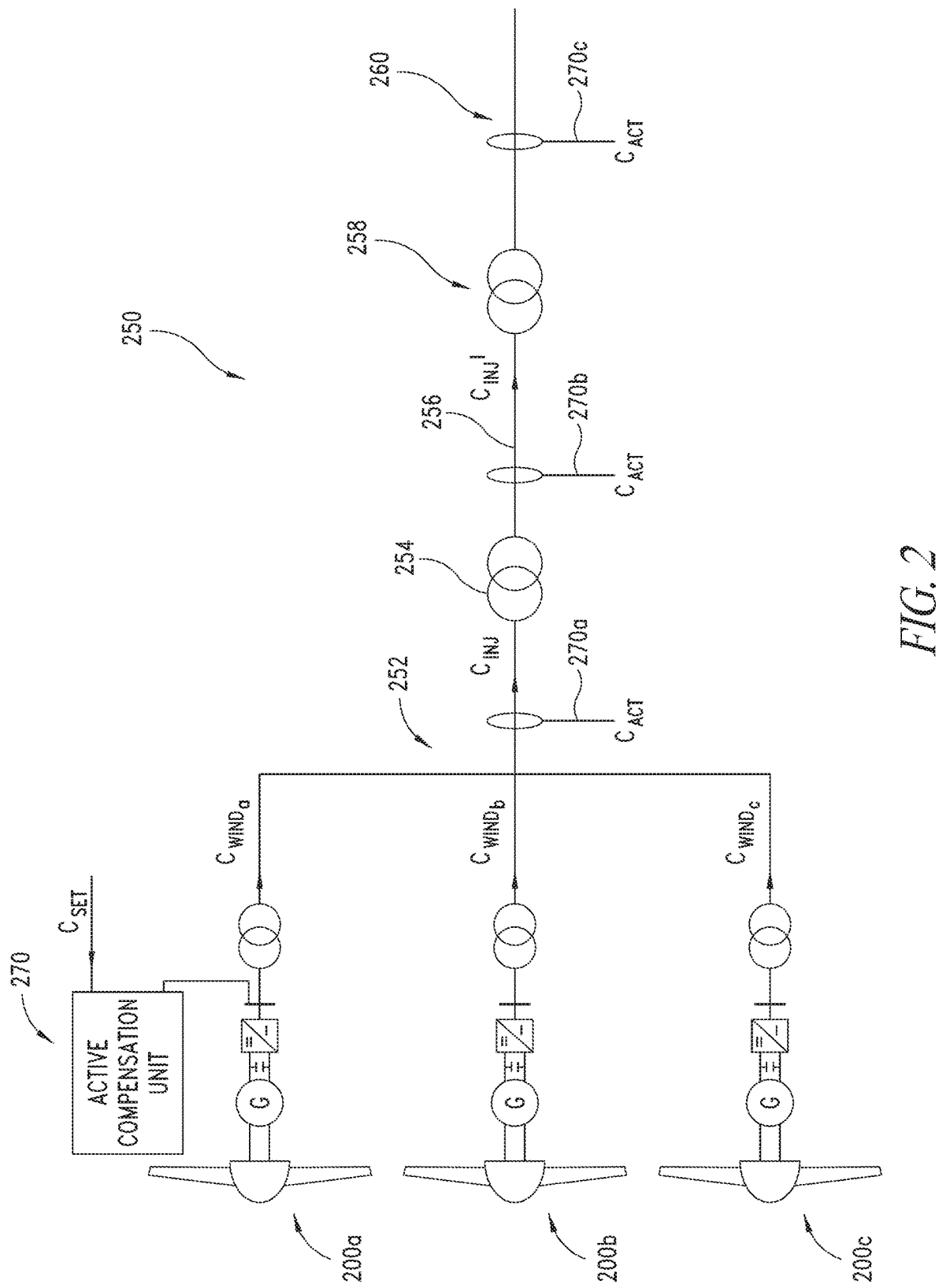
FIG. 2 shows an embodiment of a wind farm according to the invention.

FIG. 2 shows an embodiment of a wind farm 250 for feeding a total electric current $C_{inj}'$ into an electrical supply network 260 at a network connection point 258. The wind farm 250 has a plurality of wind power installations 200a, 200b, wherein each wind power installation generates a respective component current $C_{Winda}$, $C_{Windb}$, $C_{Windc}$ of the total electric current $C_{inj}'$. At least one wind power installation 200a of the wind farm 250 has an active compensation unit 270 and is designed as a compensation wind power installation 200a in order to generate a compensating component current having a modulated compensation proportion $C_{Winda}$, wherein the compensation proportion is modulated by the active compensation unit 270. In addition, the wind farm 250 has at least one further wind power installation 200b, which is configured as a wind power installation 200b without compensation, to generate a non-compensating component current without a modulated compensation proportion $C_{Windb}$, which is unmodulated with respect to modulation by an active compensation unit, that is to say is without a modulated compensation proportion. As the non-compensating component current, therefore only a sinusoidal current is generated, which, undesirably however, can deviate from an ideal sinusoidal current. The wind power installations 200b without compensation thus do not have an active compensation unit. The compensating component current having a modulated compensation proportion $C_{Winda}$ and the non-compensating component current without a modulated compensation proportion $C_{Windb}$ are superposed in the farm network 252 to form a total electric current $C_{inj}$ to be fed in. In the ideal case, the total electric current is fed into the electrical supply network 260 at the network connection point 258 in a manner free of losses as total electric current $C_{inj}'$. In addition, the wind farm usually has a section 256, for example a connecting line between the farm network 252 and the network connection point 258, which can lead to losses. It is known to a person skilled in the art to take such sections into account accordingly by virtue of, for example, adapting the currents and/or voltages accordingly.

The compensating component current having a modulated compensation proportion $C_{Winda}$ is accordingly generated so that the total current $C_{inj}'$ to be fed in influences a reference current in order to achieve a prescribed current form $C_{Set}$ for this reference current. The reference current can occur at a reference point 270a, 270b, 270c in the farm network 252, in a section 256 between the farm network and the network connection point or in the electrical supply network 260. The compensating component current having a modulated compensation proportion $C_{Winda}$ is thus generated so that a reference current occurring at a reference point 270a, 270b and/or 270c corresponds to a setpoint current, in particular corresponds in terms of its current form to a setpoint current $C_{Act}$.

The wind farm 250 can also have yet further wind power installations 200c, which are formed, for example, as wind power installations without compensation.

In addition, in a preferred embodiment, the wind power installations 200a, 200b, 200c of the wind farm 250 are embodied as wind power installations without transmissions and have synchronous generators having full converters.

Figure 3A:
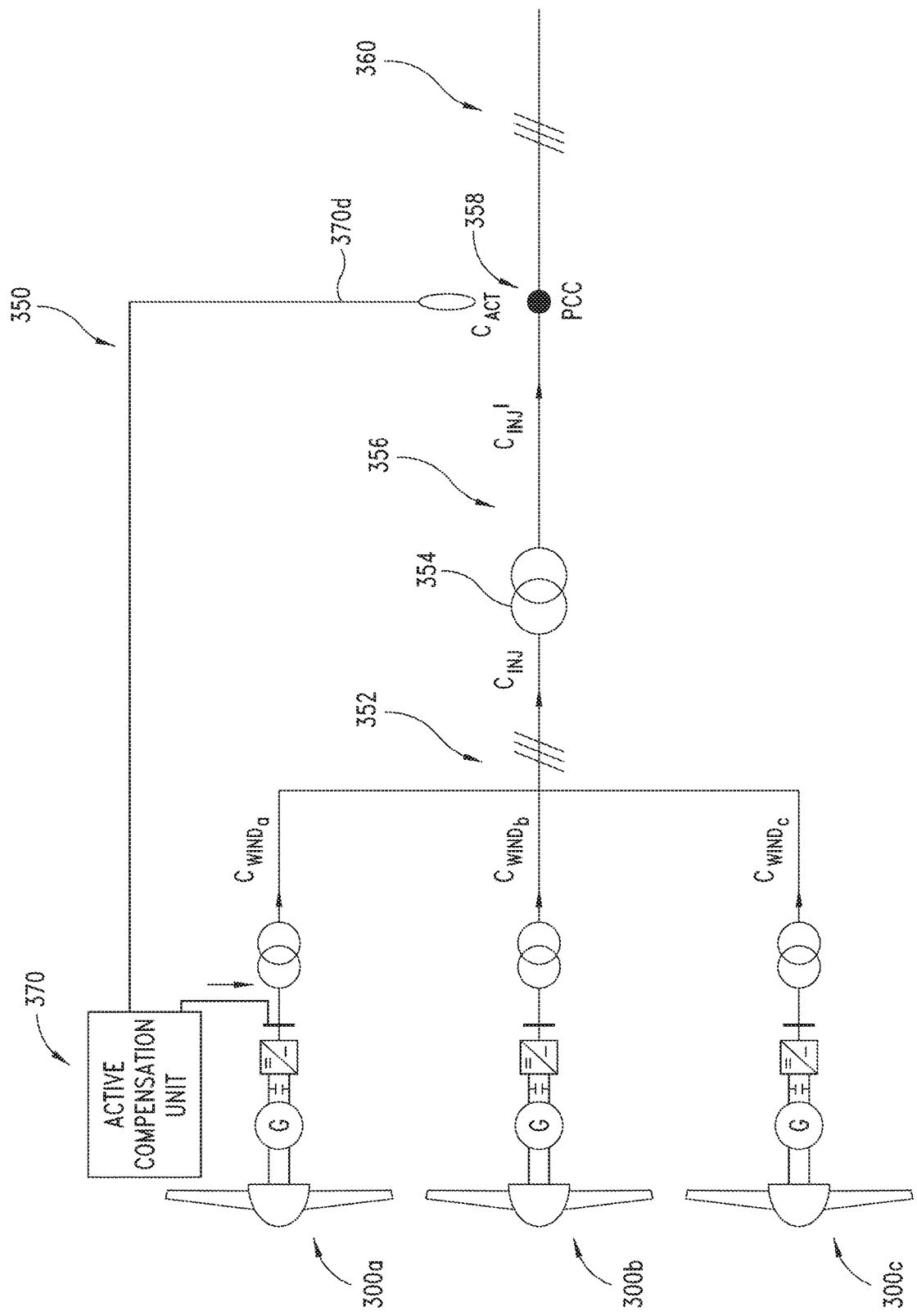
FIG. 3A shows an embodiment of a wind farm, where the reference point is the network connection point.

FIG. 3A shows a preferred embodiment 350 of a wind farm according to the invention as shown in FIG. 2. The wind farm 350 has at least one compensation wind power installation 300a having an active compensation unit 370 and further wind power installations 300b, 300c without compensation. Each of the wind power installations 300a, 300b, 300c respectively generates a component current $C_{Winda}$, $C_{Windb}$, $C_{Windc}$, wherein the compensation proportion of the compensation wind power installation $C_{Winda}$ to be modulated is generated by the active compensation unit 370, which is preferably embodied as an active filter. The compensating and non-compensating component currents generated in this way are superposed in the three-phase farm network 352 to form a total current $C_{Inj}'$ to be fed in. The total current $C_{Inj}'$ to be fed in is fed into the electrical supply network 360 at the network connection point 358 via the wind farm transformer 354 and the connection line 356.

The occurring reference current $C_{Act}$ is detected at the network connection point 358 by the detection means 370d and transmitted to the active compensation unit 370. The detection means 370d may be a harmonics analyzer, multimeter (such as a digital multimeter (DMM)), power-quality analyzer, power logger, oscilloscope or a spectrum analyzer, among others. The detection means 370d may have an input (for example, an input node or terminal) coupled to the network connection point 358 and an output (for example, an output node or terminal) coupled to the active compensation unit 370.

The active compensation unit 370 modulates the compensation proportion so that the compensating component current $C_{Winda}$ minimizes, in particular compensates, the harmonic of the reference current $C_{Act}$. In the steady state, the total current $C_{Inj}'$ to be fed in therefore corresponds to the reference current $C_{Act}$, wherein said reference current has essentially no harmonics. The wind farm 350 therefore feeds into the supply network without harmonics.

Figure 3B:
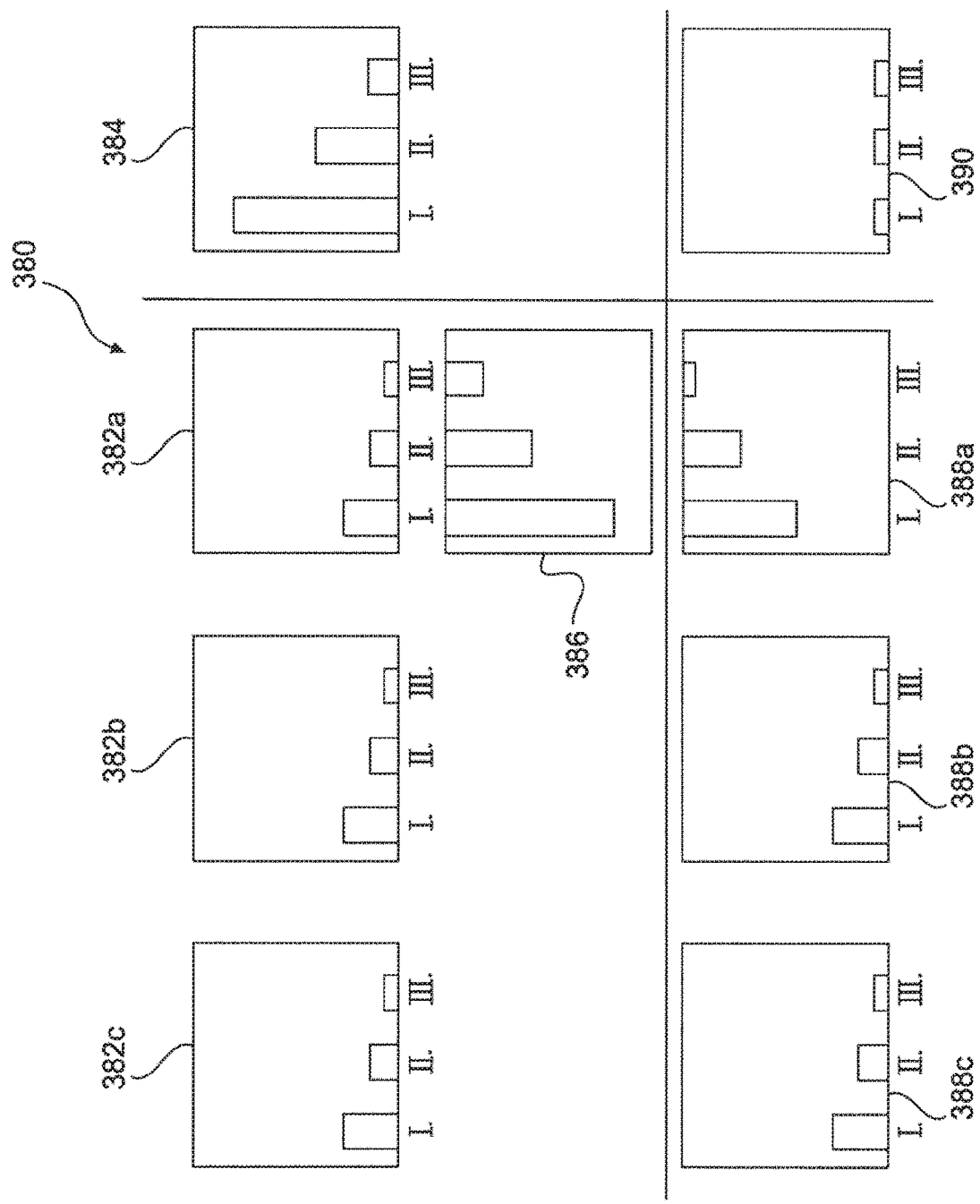
FIG. 3B shows a schematic illustration of the harmonics of a preferred embodiment of a wind farm, where the reference point is the network connection point.

FIG. 3B shows a schematic illustration of the harmonics 380 of a preferred embodiment of a wind farm according to FIG. 3A. For simplified illustration, only the first three harmonics are depicted schematically in per-unit form, namely in each case the amplitude of the respective frequency proportion. Each wind power installation of the wind farm generates a component current, which has harmonics 382a, 382b, 382c. Said harmonics add up in the farm network to form a total current to be fed in, which likewise has harmonics 384. The active compensation unit of a wind power installation now modulates the compensation proportion so that, when the non-compensating component currents that have the harmonics 388b, 388c and the compensating component currents that have the harmonics 388a are superposed, a total current to be fed in is generated, which total current has the minimum harmonics 390. The total current to be fed in by the wind farm thus essentially no longer has harmonics 390 at the network connection point.

Figure 4A:
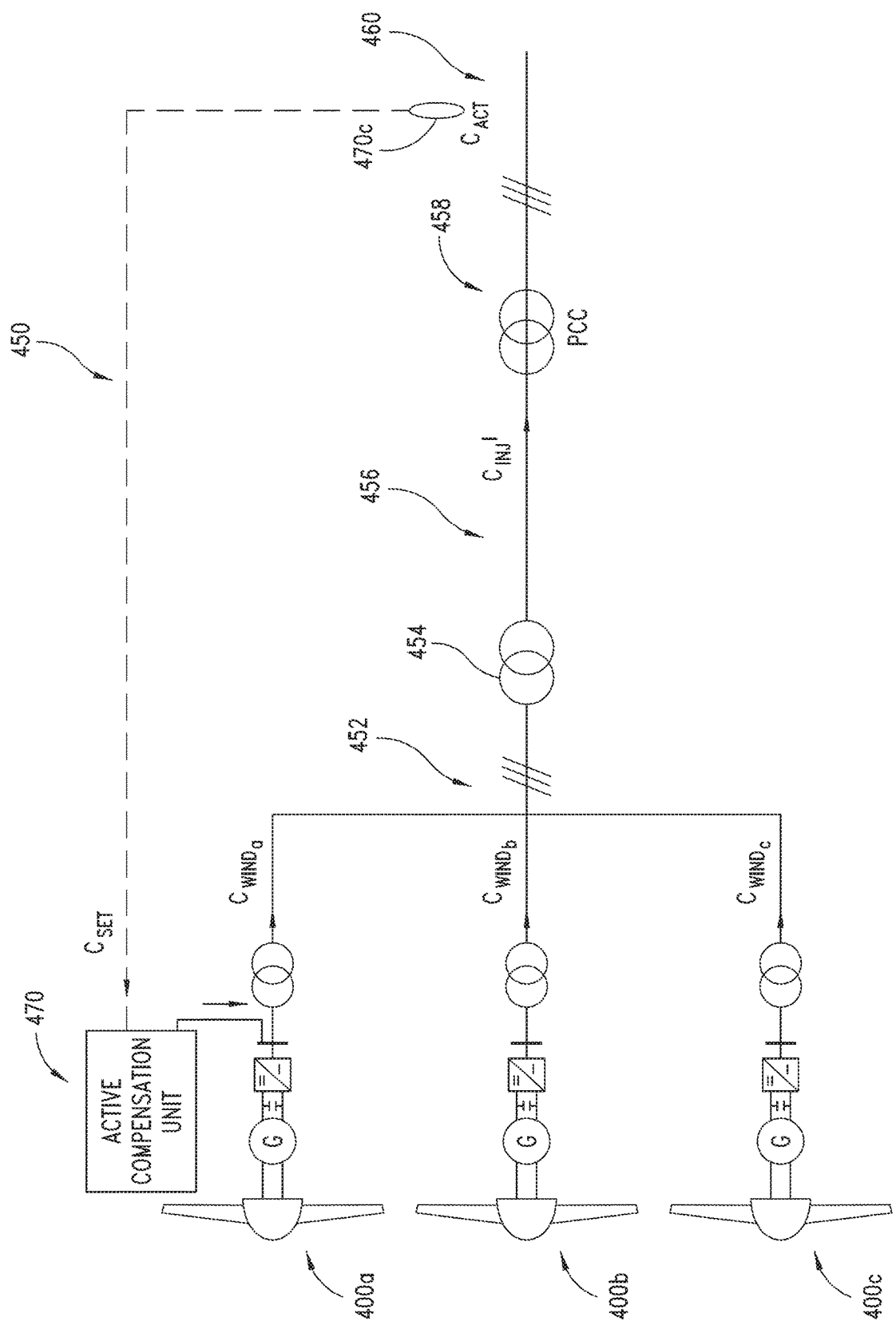
FIG. 4A shows a particularly preferred embodiment of a wind farm, where the reference point is located in the supply network.

FIG. 4A shows an embodiment 450 of a wind farm similar to that shown in FIG. 2. The wind farm 450 has at least one compensation wind power installation 400a having an active compensation unit 470 and further wind power installations 400b, 400c without compensation. Each of the wind power installations 400a, 400b, 400c respectively generates a component current $C_{Winda}$, $C_{Windb}$, $C_{Windc}$, wherein the compensation proportion of the compensation wind power installation $C_{Winda}$ to be modulated is generated by the active compensation unit 470, which is preferably embodied as an active filter. The compensating and non-compensating component currents generated in this way are superposed in the three-phase farm network 452 to form a total current $C_{Inj}'$ to be fed in. The total current $C_{Inj}'$ to be fed in is fed into the electrical supply network 460 at the network connection point 458 via the wind farm transformer 454 and the connection line 456 via a network transformer.

The occurring reference voltage $C_{Act}$ or the harmonics thereof is/are detected at a point in the supply network by way of the detection means 470c. Compensation harmonics are identified from the harmonics detected in this way and setpoint values $C_{Set}$, which are transmitted to the active compensation unit 470, are determined. The active compensation unit 470 modulates the compensation proportion so that the compensating component current $C_{Winda}$ minimizes, in particular compensates, the harmonic of the reference voltage $C_{Act}$. In the steady state, the reference voltage $C_{Act}$ therefore corresponds to a desired voltage form. The wind farm 450 therefore feeds into the supply network in a targeted manner with some harmonics so that the harmonics of the reference voltage in the supply network are minimized. The harmonics of the supply network voltage are thus minimized.

Figure 4B:
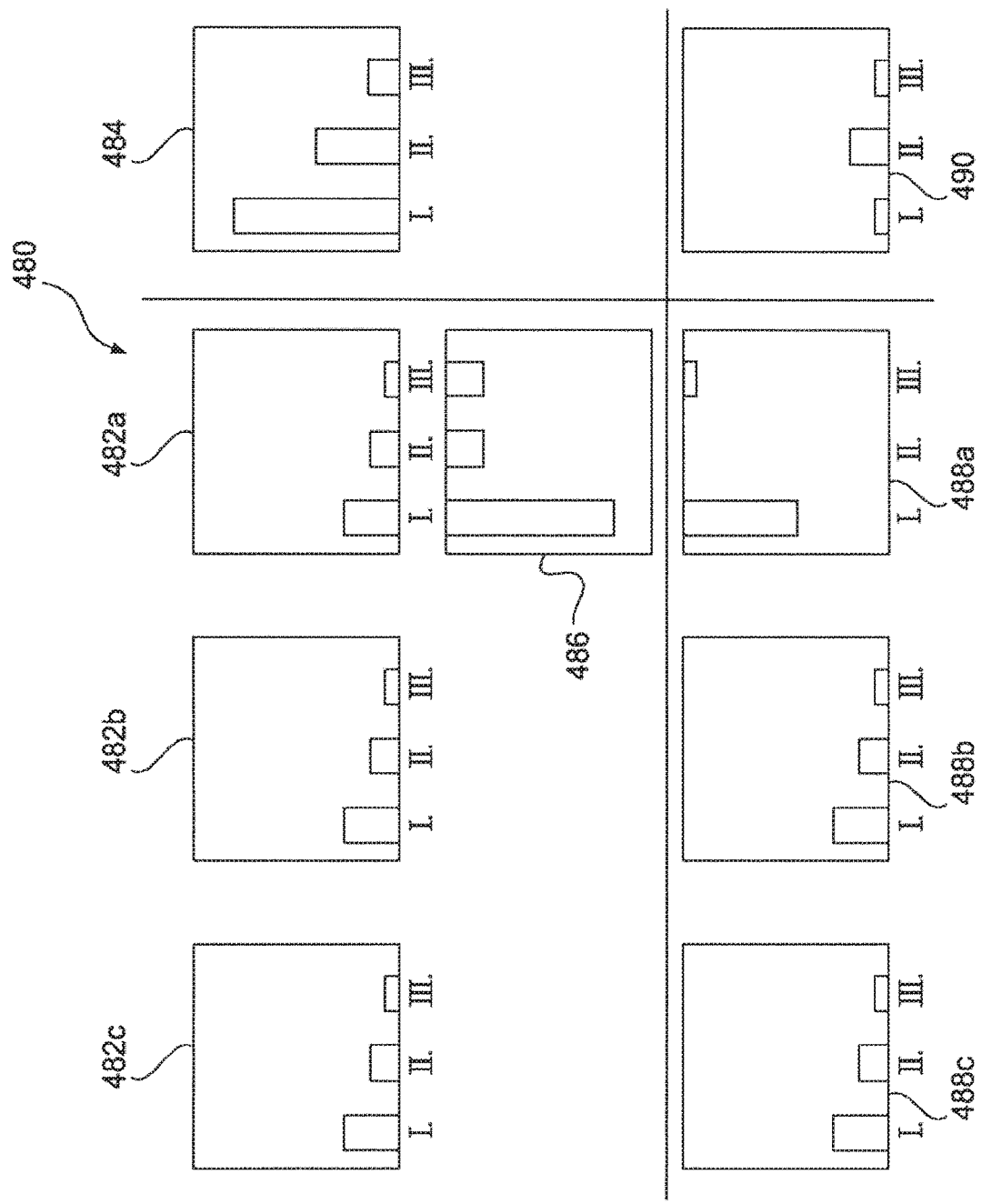
FIG. 4B shows a schematic illustration of the harmonics of a preferred embodiment of a wind farm, where the reference point is located in the supply network.

FIG. 4B shows a schematic illustration of the harmonics 480 of a preferred embodiment of a wind farm according to FIG. 4A. For simplified illustration, only the amplitudes of the respective frequency proportion of the first three harmonics are depicted schematically in per-unit form. Each wind power installation of the wind farm generates a component current, which has harmonics 482a, 482b, 482c. Said harmonics add up in the farm network to form a total current to be fed in, which likewise has harmonics 484. The active compensation unit of a wind power installation now modulates the compensation proportion so that, when the non-compensating component currents that have the harmonics 488b, 488c and the compensating component currents that have the harmonics 488a are superposed, a total current to be fed in is generated, which total current specifically has harmonics 390. The total current to be fed in from the proposed wind farm thus has some harmonics 390 at the network connection point, wherein the multiplicity of the remaining harmonics is minimized.

Figure 5:
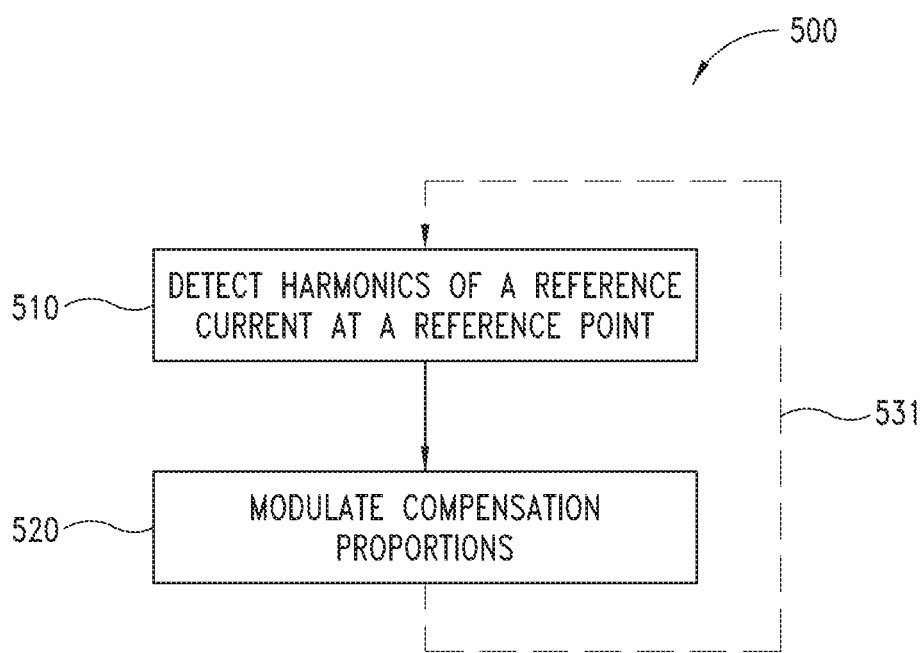
FIG. 5 shows a method sequence of a method.

FIG. 5 shows a schematic method sequence 500 of a method for feeding a total electric current into an electrical supply network at a network connection point by means of a wind farm.

In a first step 510, the harmonics of a reference current are detected at a reference point, in particular at the network connection point, for example by digital means for detecting harmonics and currents.

The harmonics detected in this way are transmitted to the active compensation units or the compensation wind power installations, which is indicated by the line 515, and, where necessary, are evaluated.

In a next step 520, the active compensation units, which are preferably configured on the low-voltage side of the compensation wind power installation, modulate the compensation proportions so that the harmonics detected at the reference point are at least reduced or compensated. This can also take place, for example, by way of prescribing setpoint values.

Due to the constantly changing prevailing wind conditions and supply network fluctuations, the method is a control method with feedback, in which the reference current is made to track a setpoint current. This is indicated in FIG. 5 by the dashed line 531.

Figure 6:
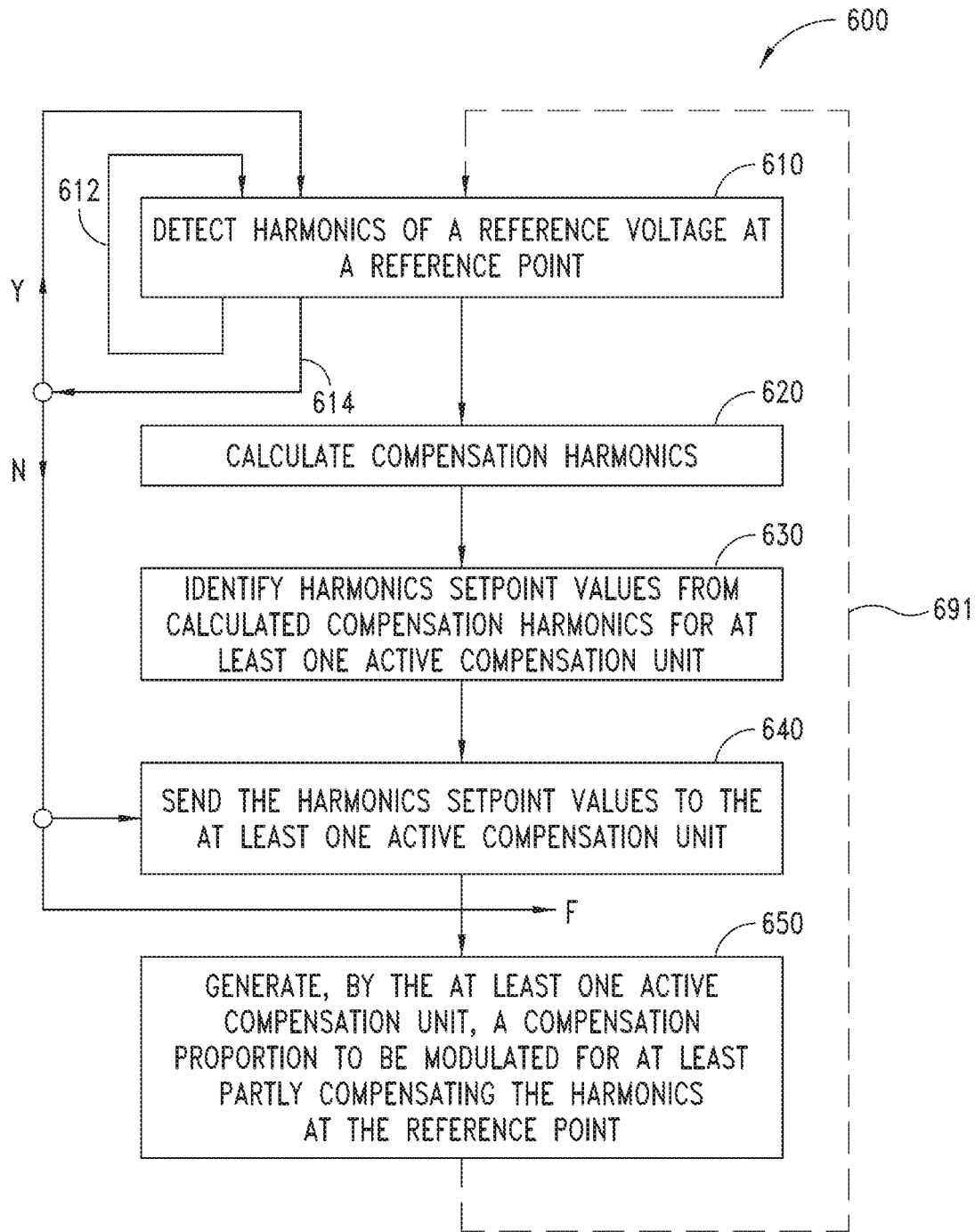
FIG. 6 shows a method sequence of a further method according to an embodiment.

FIG. 6 shows a schematic method sequence 600 of a further method for feeding a total electric current into an electrical supply network at a network connection point.

In a first step 610, the harmonics of a reference voltage are detected at a reference point in the supply network, for example by digital means for detecting harmonics and voltages.

Subsequently, in a further step 620, compensation harmonics are calculated depending on the harmonics detected at the reference point. Compensation harmonics are, in particular, those harmonics that at least partly generate attenuation of the total harmonics in the case of superposition with other harmonics. The phase positions of said harmonics are ideally phase-shifted by 180° with respect to the compensating harmonics.

In a next step 630, harmonics setpoint values are identified from the calculated compensation harmonics for at least one active compensation unit of a wind power installation of the wind farm in order to generate the identified compensation harmonics by the active compensation unit.

In a further step 640, the harmonics setpoint values are transmitted to the at least one active compensation unit.

In a further step 650, the at least one active compensation unit subsequently generates a compensation proportion to be modulated, by means of which the harmonics at the reference point in the supply network are at least partly compensated. The wind farm therefore feeds into the supply network at the network connection point specifically with specific harmonics depending on setpoint prescribing.

In a preferred embodiment, the detection of harmonics 610 comprises checking 612 whether harmonics are present, in particular whether predetermined limit values have been exceeded. In this case, in particular, the 5th, 7th, 11th, 13th, 17th and/or 19th harmonics are observed. If such harmonics are determined, generation of the compensation proportions can then optionally be carried out to compensate said harmonics. Specific harmonics in the supply network are thus monitored in a targeted manner and compensated by means of a wind farm according to the invention. To this end, the wind farm has, in particular at the network connection point, harmonics that have been modulated in a targeted manner.

In addition, the check for harmonics comprises a divergence analysis of the harmonics. If during performance of the method the harmonics converge in decreasing fashion, the method continues to be performed (Y).

In contrast, if a divergence (N) of the harmonics is determined, that is to say oscillation of the supply network in the range of the harmonics, the calculated setpoint values are retained. The generation of the compensation proportions is thus frozen at its last setpoint value, which is indicated by the line F.

The divergence of the harmonics can then either be monitored further and, in the case of convergingly decreasing harmonics being determined, can be continued or the method is suspended by means of a dead band for a certain time and the method then begins again autonomously after the dead time has elapsed.

Due to the constantly changing prevailing wind conditions and supply network fluctuations, the method is a control method with feedback, in which the reference current is made to track a setpoint current. This is indicated in FIG. 6 by the dashed line 691.

The invention claimed is:

1. A wind farm for feeding a total electric current into an electrical supply network at a network connection point, comprising:
   a compensation wind power installation having an active compensation unit which:
      modulates a compensation proportion, and
      generates a compensating component current having the modulated compensation proportion, wherein the compensating component current is generated such that the total electric current influences an occurring reference current or an occurring reference voltage to reach a prescribed current form for the reference current or a prescribed voltage form for the reference voltage, and
   a further wind power installation which generates a non-compensating component current without the modulated compensation proportion,
   wherein the wind farm:
      superposes the compensating component current and the non-compensating component current to form the total electric current to be fed in a farm network coupled to the compensation wind power installation and the further wind power installation, and
      feeds in the total electric current at a reference point, in the farm network, in a section between the farm network and the network connection point, or in the electrical supply network, and
   wherein:
      harmonics at the reference point are detected and harmonics setpoint values are identified based on the harmonics detected at the reference point,
      the active compensation unit is controlled depending on the harmonics setpoint values to generate harmonics in accordance with the harmonics setpoint values and to generate the compensating component current having the modulated compensation proportion such that the total electric current has corresponding harmonics,
      the occurring reference voltage is detected, and
      the reference point is external to the wind farm.

2. The wind farm as claimed in claim 1, comprising:
a harmonics analyzer which detects, at the reference point, the harmonics of the reference current or of the reference voltage,
  wherein the active compensation unit generates the modulated compensation proportion based on the detected harmonics occurring at the reference point so that the harmonics occurring at the reference point are compensated, reduced, or minimized.

3. The wind farm as claimed in claim 1, wherein:
the wind farm has exactly one compensation wind power installation, or
the wind farm has at least one subnetwork including exactly one compensation wind power installation.

4. A wind power installation for generating electrical power for feeding into an electrical supply network, comprising:
an active compensation unit which:
  modulates a compensation proportion to reach a setpoint current form of a reference current or a setpoint voltage form of a reference voltage at a reference point, and
  generates a compensating component current having the modulated compensation proportion,
wherein the wind power installation is a compensation wind power installation in a wind farm including:
  a further wind power installation which generates a non-compensating component current without the modulated compensation proportion, wherein the wind farm:
    superposes the compensating component current and the non-compensating component current to form a total electric current to be fed in a farm network coupled to the compensation wind power installation and the further wind power installation, and
    feeds in the total electric current at the reference point in the farm network, in a section between the farm network and a network connection point, or in the electrical supply network, and
wherein:
  harmonics at the reference point are detected and harmonics setpoint values are identified based on the harmonics detected at the reference point,
  the active compensation unit is controlled depending on the harmonics setpoint values to generate harmonics in accordance with the harmonics setpoint values and to generate the compensating component current having the modulated compensation proportion such that the total electric current has corresponding harmonics,
  the reference voltage is detected, and
  the reference point is external to the wind farm.

5. The wind power installation as claimed in claim 4, wherein
a harmonics analyzer detects, at the reference point, the harmonics of the reference current or of the reference voltage, and
the active compensation unit modulates the compensation proportion based on the detected harmonics occurring at the reference point so that the harmonics occurring at the reference point are compensated, reduced, or minimized.

6. The wind power installation as claimed in claim 4, wherein the active compensation unit is arranged on a low-voltage side of the wind power installation.

7. A method for generating at least one modulated compensation proportion of a component current by the active compensation unit of the wind power installation as claimed in claim 4, wherein the active compensation unit is provided on a low-voltage side of the wind power installation.

8. The wind farm as claimed in claim 1, wherein the active compensation unit is a filter.

9. A method for feeding, by a wind farm, a total electric current into an electrical supply network at a network connection point, comprising:
detecting, at a reference point, a reference voltage that is dependent on the total electric current,
generating at least one first component current of the total electric current by a first wind power installation, wherein the first wind power installation is configured as a compensation wind power installation and has an active compensation unit,
modulating a compensation proportion onto the at least one first component current by the active compensation unit of the first wind power installation to compensate or reduce harmonics of the reference voltage,
generating at least one second component current of the total electric current by a second wind power installation that is a non-compensating wind power installation, wherein the at least one second component current is not modulated by the compensation proportion of the active compensation unit, wherein the at least one second component current is without a modulated compensation proportion,
superposing, at a superposition point, the at least one first component current with the at least one second component current to form the total electric current to be fed in at the network connection point,
detecting harmonics at the reference point,
identifying harmonics setpoint values based on the harmonics detected at the reference point, and
controlling the active compensation unit depending on the harmonics setpoint values to generate harmonics in accordance with the harmonics setpoint values and to generate the at least one first component current having the modulated compensation proportion such that the total electric current to be fed in has corresponding harmonics, wherein the reference point is external to the wind farm.

10. The method as claimed in claim 9, comprising:
setting the harmonics setpoint values for compensation or reduction of the harmonics.

11. The method as claimed in claim 9, comprising:
detecting, by a state observer, the harmonics at the reference point,
detecting, by the state observer at the reference point, non-compensated harmonics that are not influenced by compensation achieved by the at least one first component current, and
generating the at least one first component current having the modulated compensation proportion based on the non-compensated harmonics.

12. The method as claimed in claim 9, wherein the reference point is the network connection point.

13. The method as claimed in claim 9, comprising:
determining whether the harmonics at the reference point exceed limit values.

14. The method as claimed in claim 13, comprising:
performing a divergence analysis for the harmonics at the reference point, and
when a divergence is determined to have occurred, retaining the harmonics setpoint values in response to the divergence continuing.

15. The method as claimed in claim 10, wherein a harmonics setpoint value is a reference variable for generating the at least one first component current to prescribe the harmonics of the at least one first component current or to prescribe total harmonics of the total electric current for a location other than the reference point.

16. The method as claimed in claim 13, comprising:
   determining whether a 5th, 7th, 11th, 13th, 17th or 19th harmonic at the reference point exceeds the limit values, wherein the modulated compensation proportion is modulated onto the at least one first component current only when the harmonics at the reference point exceed at least one limit value.

\* \* \* \* \*